United States Patent [19]

Ward

[11] Patent Number: 5,031,836
[45] Date of Patent: Jul. 16, 1991

[54] FLEXIBLE FAIRING FOR AIRFRAME/NOZZLE INTERFACE

[75] Inventor: Eric J. Ward, West Palm Beach, Fla.

[73] Assignee: United Technologies Corporation, Hartford, Conn.

[21] Appl. No.: 550,423

[22] Filed: Jul. 10, 1990

[51] Int. Cl.⁵ ............................................. F02K 1/52
[52] U.S. Cl. ......................... 239/265.19; 239/265.35; 239/265.37; 244/23 D; 244/13 D
[58] Field of Search .................... 239/265.19, 265.35, 239/265.37, 265.39, 265.41; 244/23 D, 52, 110 B, 130

[56] References Cited

U.S. PATENT DOCUMENTS

| | | | |
|---|---|---|---|
| 3,280,562 | 10/1966 | Theits et al. | 244/52 X |
| 3,837,580 | 9/1974 | Camboulives et al. | 239/265.39 |
| 4,525,999 | 7/1985 | Inman | 239/265.19 |
| 4,638,946 | 1/1987 | Hall | 239/265.37 |
| 4,957,249 | 9/1990 | Aulehla | 239/265.19 X |
| 4,978,071 | 12/1990 | MacLean et al. | 239/265.19 |

Primary Examiner—Andres Kashnikow
Assistant Examiner—William Grant
Attorney, Agent, or Firm—Christopher T. Hayes

[57] ABSTRACT

A flexible fairing 13 is provided which includes an aerodynamic surface 20 composed of a plurality of closely spaced, telescopic fairing members 14 and a moveable fairing panel 18. One end 15 of each fairing member 14 is pivotably secured to a divergent flap 11 of a thrust vectoring nozzle, and the other end 17 of the fairing member is pivotably secured to the fairing panel 18 which is slideably mounted to the static structure of a nozzle 19 of a gas turbine engine. The flexible fairing 13 adjusts to accommodate both translational and rotational movement of the divergent flap relative to an airframe fairing 10, thereby maintaining an aerodynamic surface 20 between the airframe fairing 10 and the divergent flap 11 of the nozzle.

15 Claims, 3 Drawing Sheets

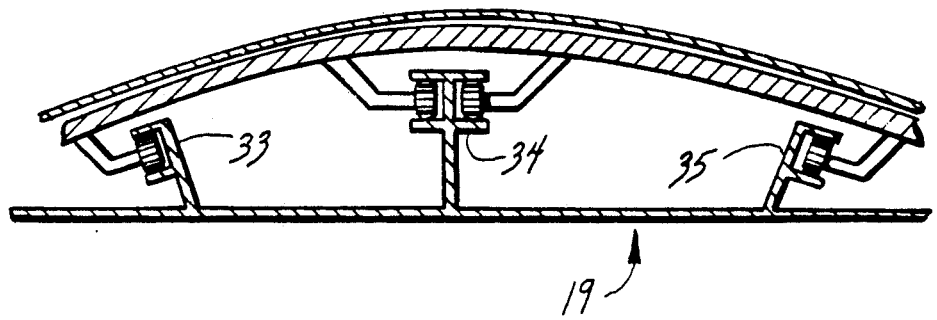
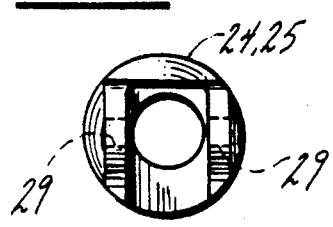
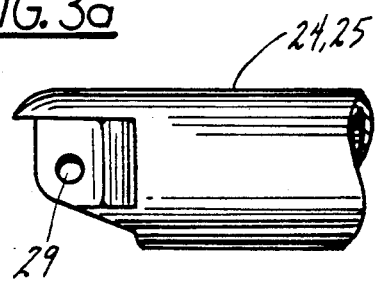
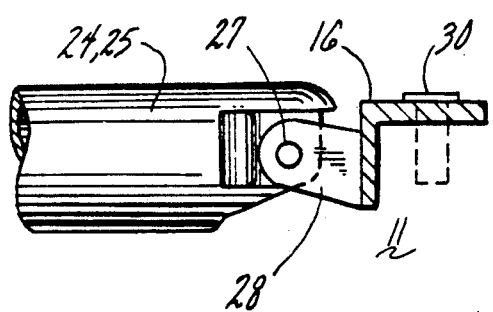
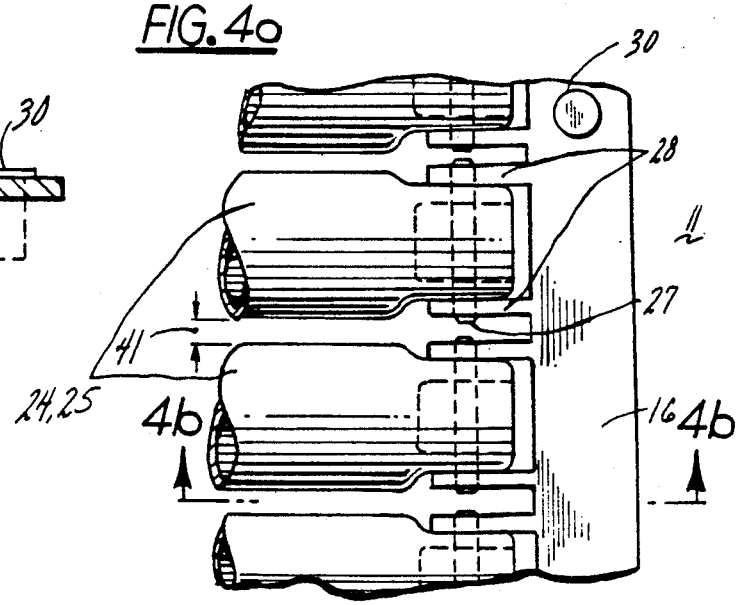

FLEXIBLE FAIRING FOR AIRFRAME/NOZZLE INTERFACE

The Government has the rights in this invention pursuant to Contract No. F33657-83-C-0092 awarded by the Department of the Air Force.

TECHNICAL FIELD

This invention relates to fairings which reduce aerodynamic drag, and in particular to fairings for use with two components which move relative to each other.

BACKGROUND ART

One of the problems facing manufacturers of high performance aircraft is aerodynamic drag and the penalties in speed and fuel consumption which occur as a result of such drag. One aircraft location where drag often occurs is the interface between the airframe fairing and the moveable divergent flaps of the nozzle of a gas turbine engine. Air flowing off the airframe fairing may become turbulent, forming recirculation vortices at the interface, and increasing the overall drag of aircraft.

A solution to this problem is to provide an aerodynamic surface at the airframe fairing/movable flap interface. In the past, essentially rigid fairing flaps have been used to span between the divergent flaps and the static components of the nozzle or airframe. However, the rigid fairing flaps used in the past are unsuitable for use in conjunction with thrust vectoring gas turbine exhaust nozzles, due to the geometries involved.

In a typical aircraft having a thrust vectoring nozzle, the airframe fairing may have a curved surface and a trailing edge characterized by a complex geometry, such as chevrons. The surface of the divergent flap may likewise have a complex geometry. In addition, the nozzle's divergent flaps may rotate and translate with respect to the airframe fairing during aircraft operation. Although rigid fairing flaps attached to the trailing edge of the airframe fairing may provide an aerodynamic surface at the divergent flap position for which they were designed, rigid fairing flaps would produce substantial drag at many other divergent flap positions.

DISCLOSURE OF THE INVENTION

It is therefore an object of the present invention to provide a fairing which can accommodate both rotational and translational movement between the components to which it is secured.

Another object of the present invention is to provide a fairing which can be quickly and easily installed and removed.

Another object of the present invention is to provide a flexible fairing for a thrust vectoring gas turbine engine nozzle.

According to the present invention a flexible fairing is provided which includes an aerodynamic surface composed of a plurality of closely spaced, elongated telescopic members. One end of each telescopic member is pivotably secured to a divergent flap of the nozzle, and the other end of the telescopic member is pivotably secured to a moveable fairing panel which is mounted within the nozzle static structure. Fixed-length, elongated connecting members are likewise pivotably secured to both the divergent flap and the fairing panel.

The fairing panel rolls along guide tracks mounted inside of the nozzle static structure adjacent the trailing edge of the airframe fairing. These guide tracks are oriented so as to allow the fairing panel to move substantially forward and aftward. The connecting members pull or push the fairing panel as the respective divergent flap moves, extending or retracting the fairing panel.

During nozzle operation, each divergent flap rotates and translates relative to the airframe fairing, causing the telescopic members to pivot and/or telescope, and causing the fairing panel to extend or retract. Airflow coming off the aircraft fairing flows along the extended portion of the fairing panel, and then along the telescopic members which, due to their close spacing, essentially form an aerodynamic surface which reduces drag. Consequently, the present invention provides the aerodynamic benefit of prior fairings, while providing the flexibility required for use with rotating, translating components such as movable divergent flaps of thrust vectoring nozzles.

The foregoing and other features and advantages of the present invention will become more apparent from the following description and accompanying drawings.

BRIEF DESCRIPTION OF DRAWINGS

FIG. 3a is a side view of an endpiece of a telescopic member.

FIG. 3b is an end view of the endpiece of FIG. 3a.

FIG. 4a is a top view of the support bracket which connects the telescopic members to the divergent flap.

FIG. 4b is a cross-section of the support bracket of FIG. 4a taken along line 4b—4b.

FIG. 5 is a cross-sectional view of the guide tracks which support the fairing panel.

BEST MODE FOR CARRYING OUT THE INVENTION

Figure 1:
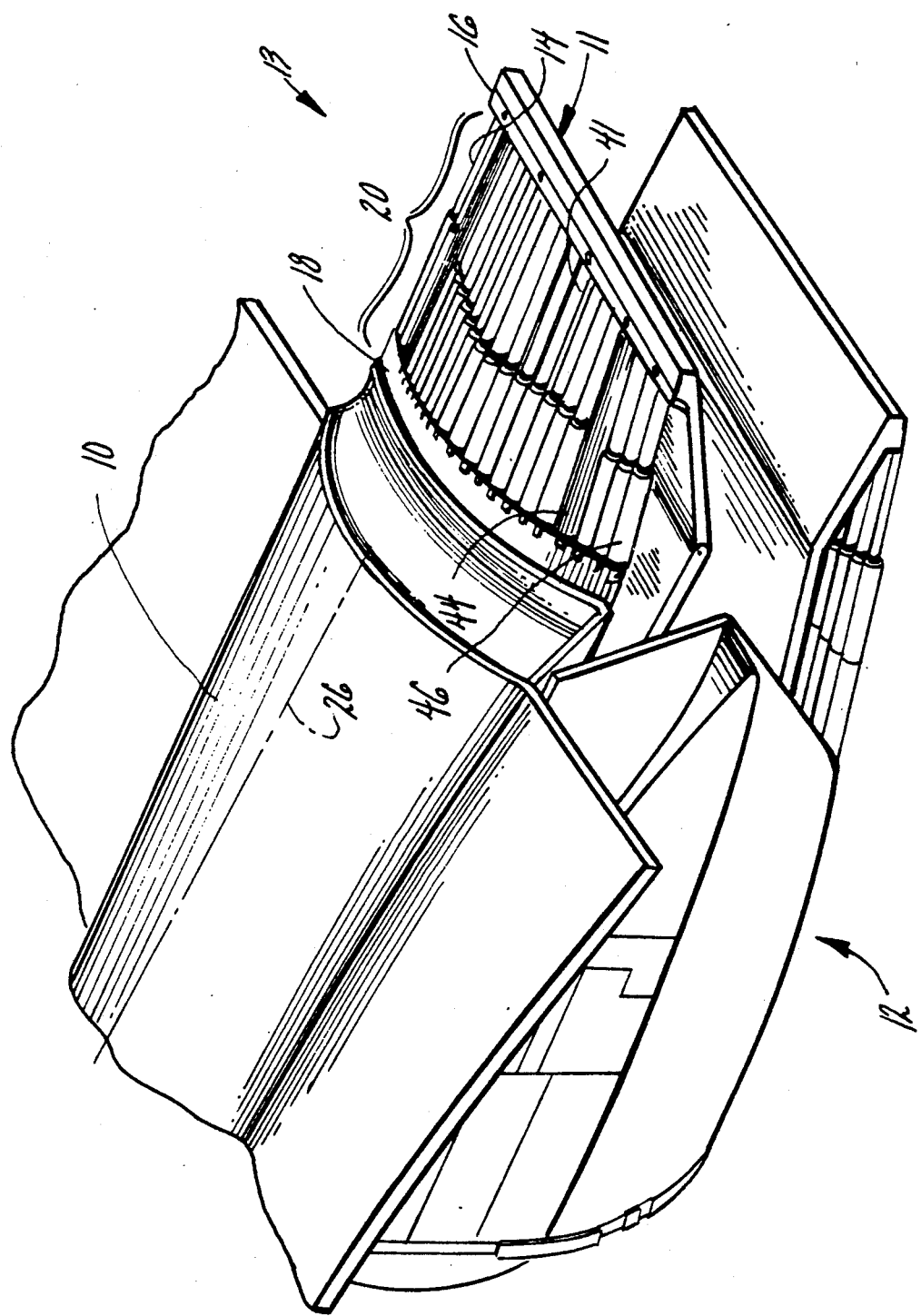
FIG. 1 is a side view, in elevation, of an airframe fairing and a gas turbine nozzle incorporating the flexible fairing of the present invention.
Figure 2:
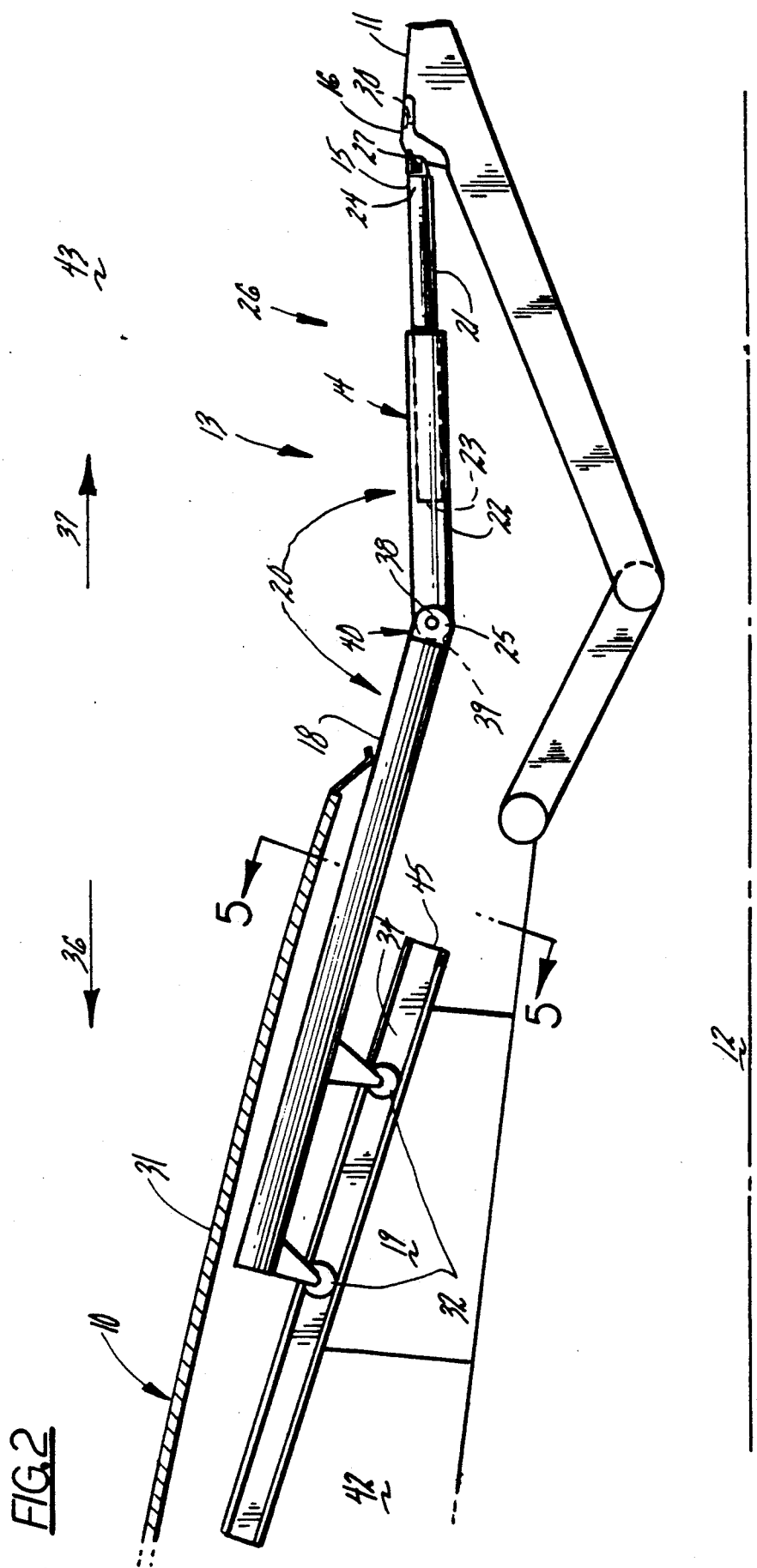
FIG. 2 is a cross-section of the components of FIG. 1 and the flexible fairing which connects them.

FIG. 1 shows an airframe fairing 10 and a movable divergent flap 11 of a thrust vectoring gas turbine exhaust nozzle 12 incorporating the flexible fairing 13 of the present invention. Although the flexible fairing 13 of the present invention is disclosed herein as used in an aircraft application, such application is exemplary only and is not intended to limit the scope of the claims. As shown in FIG. 2, the flexible fairing 13 extends from the airframe fairing 10 to the divergent flap 11 of the nozzle 12. The flexible fairing 13 includes a plurality of elongated, telescopic members 14, each of which has one end 15 secured to a support bracket 16, which is in turn connected to the divergent flap 11. The opposite end 17 of each telescopic member 14 is similarly secured to a fairing panel 18 which is slideably mounted to the static structure of the nozzle 19. The fairing panel 18 is described in greater detail below.

Most of the aerodynamic surface 20 of the flexible fairing 13 is provided by the telescopic members 14, each of which includes an inner member 21 and an outer member 22. The forward end 23 of each inner member 21 is slideably received within the respective outer member 22, allowing the telescopic member 14 to increase or decrease in length telescopically. The telescopic members 14 are preferably made of graphite polyimide, to minimize friction between the inner members 21 and the outer members 22, and to reduce the need for periodic lubrication. However, the telescopic members 14 may be made of any other suitable material, such as titanium, depending upon the particular application in which the flexible fairing 13 is used.

At each end of each telescopic member 14 is endpiece 24, 25, preferably of the type shown in FIGS. 3a and 3b, which allows the telescopic member 14 to pivot freely. The aft end 15 of each telescopic member 14 is pivotably secured to a support bracket 16 of the type shown in FIGS. 4a and 4b, by a pin 27 which extends through the hinge arms 28 of the support bracket 16 and the pin holes 29 of the endpiece 24 of the telescopic member 14. The support bracket 16 is in turn detachably secured to the divergent flap 11 by a plurality of screws or bolts 30, as shown in FIG. 2.

Forward of the telescopic members 14 is the fairing panel 18, the purpose of which is to provide an aerodynamic surface 20 between the airframe fairing 10 and the telescopic members 14. The fairing panel 18 is mounted on rollers 32 which run in guide tracks 33, 34, 35 secured to the static structure of the nozzle 19, as shown in FIG. 5. In the preferred embodiment, three guide tracks 33, 34, 35 support the fairing panel 18, the two outer guide tracks 33, 35 being "C" channels, and the center guide track 34 being an "I" beam. The orientation of the guide tracks 33, 34, 35 allows the fairing panel 18 to slide forward 36 and aftward 37, and allows the fairing panel 18 to be easily removed and reinstalled, as described below.

The fairing panel 18 includes a panel bracket 40 which is similar to the support bracket 16 described above. The forward endpiece 25 of each of the outer members 22 is pivotably secured to the fairing panel 18 by a pin 38 which extends through the hinge arms 39 of the panel bracket 40 and the pin holes 29 of the endpiece 25. Although the telescopic members 14 are disclosed herein as being connected to adjoining components by pins 27, 38, those skilled in the art will appreciate that other pivotal means, such as ball and socket joints, could be used as well. In addition, although the preferred embodiment is disclosed as having the outer member 22 attached to the panel bracket 40 and the inner member 21 attached to the support bracket 16, those skilled in the art will appreciate that, alternatively, the inner member 21 could be attached to the panel bracket 40 and the outer member 22 could be attached to the support bracket 16.

The support bracket 16 and the panel bracket 40 support the telescopic members 14 and the connecting members 44 in spaced relation to each other, to provide a minimum gap 41 therebetween. In the preferred embodiment, the minimum gap 41 between any two adjacent telescopic members 14 is 10 to 20 mils (0.25 to 0.50 mm). Such a gap 41 is large enough to ensure that the telescopic members 14 do not rub against each other, yet the telescopic members 14 are close enough to form an aerodynamic surface 20. These gaps 41 also permit airflow through the flexible fairing 13 to equalize any pressure differentials that may occur between the interior of the engine nacelle 42 and the ambient air 43, during engine operation.

In addition to the telescopic members 14, the flexible fairing 13 preferably includes at least two connecting members 44 as shown in FIG. 1, extending between the fairing panel 18 and the support bracket 16. In contrast to the telescopic members 14, the connecting members 44 are fixed in length, and the length of each connecting member 44 is significantly less than the length of a fully extended telescopic member 14. The connecting members 44 thereby prevent the inner members 21 and the outer members 22 from separating due to excessive telescoping.

Referring to FIG. 1, as the divergent flap 11 moves upward, the telescopic members 14 between the connecting members 44 reduce in length due to the decreasing distances between the various points along the curved fairing panel 18 where the telescopic members 14 are attached and the corresponding attachment points of the telescopic members 14 along the divergent flap 11. Conversely, those telescopic member 14 not located between the connecting members 44 increase in length as the divergent flap 11 moves upward. Thus the telescopic members 14 are able to telescope in response to relative movement between the fairing panel 18 and the divergent flap 11 despite the presence of the connecting members 44.

In addition to preventing excessive telescoping of the telescopic members 14, the connecting members 44 locate the fairing panel 18 at a fixed distance from the divergent flap 11. Thus, the connecting members 44 cause the fairing panel 18 to move forward 36 or aftward 37 in response to the movement of the divergent flap 11. The length of each connecting member 44 is long enough to prevent the rollers 32 of the fairing panel 18 from running out the aft ends 45 of the guide tracks 33, 34, 35 at all positions of the divergent flap 11. Although the preferred embodiment is disclosed as having two connecting members 44, those skilled in the art will recognize that a single connecting member 44 positioned along the longitudinal centerline 26 of the flexible fairing 13 could be used if the single connecting member 44 were able to both locate the fairing panel 18 and prevent excessive telescoping of the telescopic members 14.

The connecting members 44 are preferably made of the same material as the telescopic members, but may be made of any other suitable material. The ends of each connecting member 44 are similar to those of the telescopic members 14, and are attached to the panel bracket 40 and the support bracket 16 in the same manner used to attach the telescopic members 14. To provide a symmetric aerodynamic surface 20, the connecting members 44 are spaced symmetrically with the longitudinal centerline 26 of the flexible fairing 13, preferably midway between the centerline 26 and either of the longitudinal edges 46 of the flexible fairing 13. Except for its length, the outer dimensions of each connecting member 44 is essentially equal to the outer dimensions of the outer members 22 to provide for the same minimum gap 41 between each connecting member 44 and the adjacent telescopic members 14 as discussed above.

The design of the present invention is such that the flexible fairing 13 can be removed by merely unscrewing the support bracket 16 from the divergent flap 11, raising the support bracket 16, telescopic members 14, and connecting members 44 clear therefrom, and pulling the fairing panel 18 aftward until the all of the rollers 32 clear the aft ends 45 of the guide tracks 33, 34, 35. Installation of the flexible fairing 13 is simply a matter positioning the rollers 32 back into the guide tracks 33, 34, 35 and securing the support bracket 16 with the screws or bolts 30. Consequently, a worn or damaged flexible fairing 13 can be removed and replaced with a spare flexible fairing 13 with a minimal amount of time and effort.

During aircraft operation at cruise conditions, the telescopic members 14 are substantially parallel to each other, forming an aerodynamic surface 20 for airflow from the airframe fairing 10 to the divergent flap 11. As the divergent flap 11 rotates and translates relative to the airframe fairing 10, the fairing panel 18 and telescopic members 14 adjust to accommodate the motion of the divergent flap 11, while maintaining a substantially aerodynamic surface 20. During transient operation, such as thrust vectoring, the surface 20 formed by the telescopic members 14 may produce more drag than is experienced at cruise conditions, due to the positioning of some of the telescopic members 14. However, even during transient operation, the flexible fairing 13 generally produces less drag than would be experienced if there were no fairing spanning between the airframe fairing 10 and the divergent flap 11.

The flexible fairing 13 of the present invention provides an aerodynamic surface 20 for the interface of two components. The telescopic and pivotal nature of the flexible fairing 13 accommodates both translational and rotational movement between the two components at all aircraft operating conditions. Consequently, the present invention provides the aerodynamic benefit of fairings of the prior art, while providing the flexibility required for use on installations such as thrust vectoring nozzles.

Although this invention has been shown and described with respect to detailed embodiments thereof, it will be understood by those skilled in the art that various changes in form and detail thereof may be made without departing from the spirit and scope of the claimed invention.

We claim:

1. A flexible fairing to reduce aerodynamic drag at an interface of a first component and a second component, the flexible fairing comprising:
   a plurality of fairing members, each of the fairing members including
   an outer member, and
   an inner member, the outer member having a first endpiece, the inner member slideably received within the outer member and having a second endpiece; and,
   means for supporting each of the fairing members in spaced relation to adjacent fairing members, the support means detachably mounted to the second component;
   wherein one of the first or second endpieces of each of the fairing members is pivotably connected to the support means, each of the fairing members extends between the first and second components, each of the fairing members telescopes to adjust to movement of the second component relative to the first component, and each of the fairing members is spaced sufficiently close to adjacent fairing members to form an aerodynamic surface between the first component and the second component.

2. The flexible fairing of claim 1 further comprising:
   a fairing panel slideably mounted to the first component, with one of the first or second endpieces of each of the fairing members pivotably attached to the fairing panel; and,
   at least one fixed-length connecting member, the connecting member having opposed ends pivotably attached to the fairing panel and the support means to position the fairing panel with respect to the second component.

3. The flexible fairing of claim 2 wherein the fairing panel includes rollers which are slideably received within at least one guide track mounted to the first component.

4. The flexible fairing of claim 2 wherein the support means comprise a support bracket, and each of the fairing members and the connecting members is connected to the support bracket and to the fairing panel by pins.

5. The flexible fairing of claim 2 wherein between each of the fairing members and adjacent fairing or connecting members a minimum gap of 10 to 20 mils is provided to form the aerodynamic surface.

6. The flexible fairing of claim 2 wherein the fairing members and the connecting members are made of titanium.

7. The flexible fairing of claim 2 wherein the fairing members and the connecting members are made of graphite polyimide.

8. The flexible fairing of claim 1 wherein the first component is an airframe fairing and the second component is a moveable flap of a gas turbine engine nozzle.

9. The flexible fairing of claim 8 further comprising:
   a fairing panel slideably mounted to the first component, with one of the first or second endpieces of each of the fairing members pivotably attached to the fairing panel, and means for positioning the fairing panel relative to the second component.

10. The flexible fairing of claim 9 wherein the fairing panel includes rollers which are slideably received within at least one guide track mounted to the first component.

11. The flexible fairing of claim 10 wherein the support means comprise a support bracket, and each of the fairing members and the connecting members is connected to the support means and to the fairing panel by pins.

12. The flexible fairing of claim 11 wherein the means for positioning the fairing panel comprise:
   at least one fixed-length connecting member, the connecting member having opposed ends pivotably attached to the fairing panel and the support bracket.

13. The flexible fairing of claim 12 wherein between each of the fairing members and adjacent fairing or connecting members a minimum gap of 10 to 20 mils is provided to form the aerodynamic surface.

14. The flexible fairing of claim 13 wherein the fairing members and the connecting members are made of titanium.

15. The flexible fairing of claim 13 wherein the fairing members and the connecting members are made of graphite polyimide.

* * * * *

UNITED STATES PATENT AND TRADEMARK OFFICE
CERTIFICATE OF CORRECTION

PATENT NO. : 5,031,836

DATED : July 16, 1991

INVENTOR(S) : Eric J. Ward

It is certified that error appears in the above-identified patent and that said Letters Patent is hereby corrected as shown below:

Column 3, line 48, "!6" should read --16--

Column 4, line 49, "!3" should read --13--

Signed and Sealed this

First Day of December, 1992

Attest:

DOUGLAS B. COMER

Attesting Officer

Acting Commissioner of Patents and Trademarks